Jan. 15, 1952     C. A. STEEN     2,582,801
BOILING PAN WITH ELASTIC SEALING RINGS
Filed Aug. 7, 1947
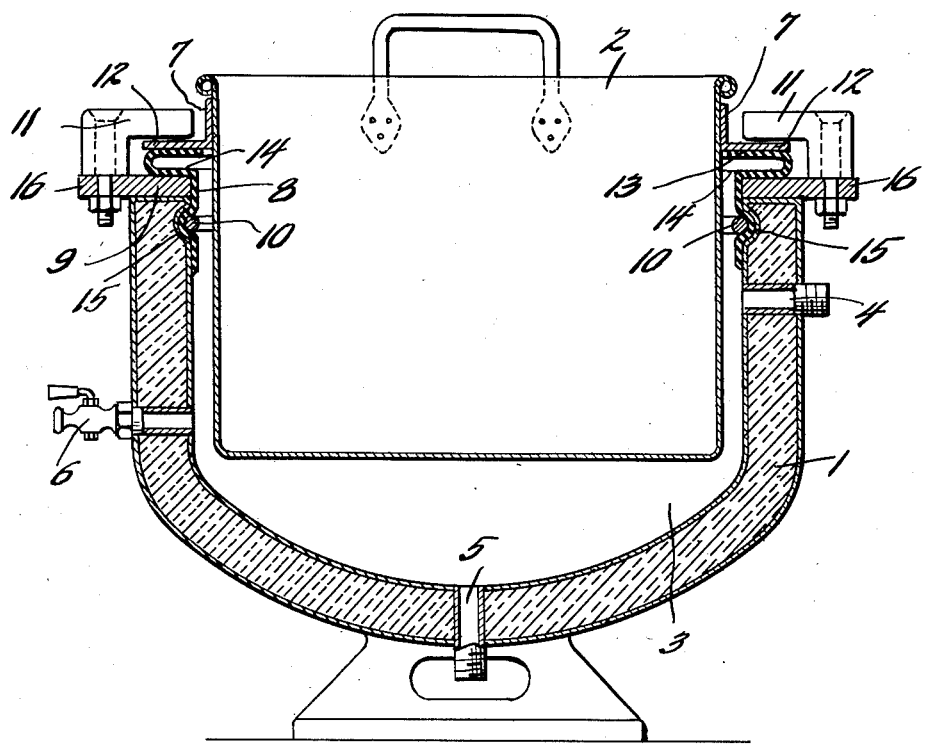
INVENTOR
*Carl August Steen,*
BY *Sommers+Young*
ATTORNEYS Patented Jan. 15, 1952

2,582,801

UNITED STATES PATENT OFFICE 2,582,801

BOILING PAN WITH ELASTIC
SEALING RINGS

Carl August Steen, Getinge, Sweden

Application August 7, 1947, Serial No. 767,194
In Sweden June 21, 1939

Section 1, Public Law 690, August 8, 1946
Patent expires June 21, 1959

3 Claims. (Cl. 126—378)

1

The invention refers to a steam boiling pan with a jacket open at the top and a cooking vessel immersed with its lower part therein. Between the vessel and the jacket is formed a steam space, in which the steam is generated or to which steam is supplied by a steam pipe for heating the cooking vessel.

One object of the invention is to provide an efficient sealing device between the jacket and the vessel of a simple construction by which the steam pressure is utilized for obtaining a tight joint, even if the metal surface resting against the sealing member is not quite smooth and plane.

Another object is to provide a sealing device of such a construction that the steam pressure facilitates the removal of the vessel.

A boiling pan according to the invention is illustrated in vertical section on the accompanying drawing. In a heat insulated jacket 1 is immersed a cooking vessel 2 of any suitable form. Between them is formed a steam space 3 to which steam of low pressure is supplied by a pipe 4, and from which the condensate is drawn off by the pipe 5. The steam space can be allowed to communicate with the air by a cock 6. The cooking vessel is at the top provided with a ring of angle iron 7 having a projecting ring-shaped flange 12 for supporting and holding the vessel in position. A sealing ring of rubber or other resilient material is fastened to the jacket and rests with the upper surface of a free, inwards directed edge portion 13 against the underneath side of the flange 12. The middle portion 14 rests on a metal ring plate 9, and the other edge portion 8 is pressed against the inner wall of the jacket by means of a metal ring 10 forcing the rubber ring into a groove 15 in the wall. In each of a number of ears 16 projecting from the ring plate 9 is pivotedly mounted a wing-shaped lock handle or finger 11 which prevents the vessel from being lifted by the steam pressure. From the drawing it appears that the steam presses the portions 8 and 14 of the rubber ring against the inner wall and the upper wall of the jacket as well as the upper surface of the portion 13 against the flange of the vessel by the pressure exerted on the opposite or lower surface of the portion 13, so that a gas-tight connection between the jacket and the vessel is obtained. The lock handle allows the vessel to be lifted so much that the steam obtains access to the pocket formed by the rubber ring between the flange and the jacket. The connection is thus rendered gas-tight automatically by the steam itself without the use of any screw nuts.

The embodiment as shown on the drawing may be varied in different ways within the scope of the invention, thus, for instance, the steam instead of being supplied from an outer steam system may be generated in known manner within the steam space by electrodes in water, gas or superheated steam.

I claim:

1. In a steam boiling pan, a steam jacket, a cooking vessel mountable in said jacket and having a projecting ring-shaped flange, said vessel being smaller than said jacket so as to leave a steam space between said jacket and said vessel, a locking device rotatably mounted on the jacket adjacent said flange and having a laterally extending portion for extending over said flange when turned in one direction so as to maintain the cooking vessel in place when subjected to lifting effect of steam in the steam jacket, and a sealing ring of an elastic material provided between said jacket and said projecting flange, said sealing ring being fastened along the upper edge of said jacket and having an inwardly extending free edge portion adapted to be pressed with one surface thereof from below against said projecting flange by the steam exerting a pressure against the opposite surface of said free edge portion.

2. In a steam boiling pan, a jacket, a cooking vessel having a projecting ring-shaped flange, a steam space between said jacket and said vessel, pivoted locking fingers for cooperating as counter supports with the upper surface of said projecting flange, and a sealing ring of an elastic material provided between said jacket and said projecting flange, said sealing ring being fastened along the upper edge of said jacket and having an inwardly extending free edge portion adapted to be pressed with one surface thereof from below against said projecting flange by the steam exerting a pressure against the opposite surface of said free edge portion.

3. In a steam boiling pan, a steam jacket, a cooking vessel mountable in said jacket and having a projecting ring-shaped flange, said vessel being smaller than said jacket so as to leave a steam space between said jacket and said vessel, a locking device rotatably mounted on the jacket adjacent said flange and having a laterally extending portion for extending over said flange when turned in one direction so as to maintain the cooking vessel in place when subjected to lifting effect of steam in the steam jacket, and a sealing ring of an elastic material provided between said jacket and said projecting flange, said sealing ring being fastened along the upper edge of said jacket and having an inwardly extending free edge portion adapted to be pressed with one surface thereof from below against said projecting flange by the steam exerting a pressure against the opposite surface of said free edge portion, and an other edge portion of said sealing ring being pressed by a metal ring into a groove formed in said jacket.

CARL AUGUST STEEN.

REFERENCES CITED

The following references are of record in the file of this patent:

UNITED STATES PATENTS

| Number | Name | Date |
|---|---|---|
| 942,171 | Ecaubert | Dec. 7, 1909 |
| 993,013 | Bartlett | May 23, 1911 |
| 1,290,378 | Sibley | Jan. 7, 1919 |
| 1,499,364 | Goodrick | July 1, 1924 |
| 1,711,176 | Moore | Apr. 30, 1929 |
| 1,816,883 | Willshaw | Aug. 4, 1931 |
| 1,901,581 | Chamberlain | Mar. 14, 1933 |
| 2,090,182 | Burpee | Aug. 17, 1937 |

FOREIGN PATENTS

| Number | Country | Date |
|---|---|---|
| 18,914 | Great Britain | of 1907 |
| 78,264 | Sweden | Aug. 26, 1931 |
| 98,888 | Sweden | May 14, 1940 |
| 100,884 | Sweden | Feb. 18, 1941 |